United States Patent [19]

Mayweather III et al.

[11] Patent Number: 4,963,964

[45] Date of Patent: Oct. 16, 1990

[54] APPARATUS FOR COMPUTING INTERPOLATION WEIGHTING FACTOR FOR TIME COMPRESSION OR EXPANSION

[75] Inventors: William T. Mayweather III, Lawrenceville; Robert F. Nutter, Princeton, both of N.J.

[73] Assignee: RCA Licensing Corporation, Princeton, N.J.

[21] Appl. No.: 472,553

[22] Filed: Jan. 30, 1990

[51] Int. Cl.$^5$ ............................................. H04N 7/12
[52] U.S. Cl. ................................... 358/134; 358/138; 358/140
[58] Field of Search ................ 358/133, 134, 138, 140

[56] References Cited

U.S. PATENT DOCUMENTS 4,855,811  8/1989  Isnardi ................................... 358/12

Primary Examiner—Howard W. Britton
Attorney, Agent, or Firm—Joseph S. Tripoli; Eric P. Herrmann; Ronald H. Kurdyla

[57] ABSTRACT

In the context of a video signal raster mapper, apparatus is disclosed to facilitate time compression or expansion by developing an auxiliary signal (DX) representing a fractional position of output pixel samples between input pixel samples. A multiplexer selectively applies values from two registers to an accumulator for controlling the accumulator value in a manner appropriate for compression or expansion.

6 Claims, 5 Drawing Sheets

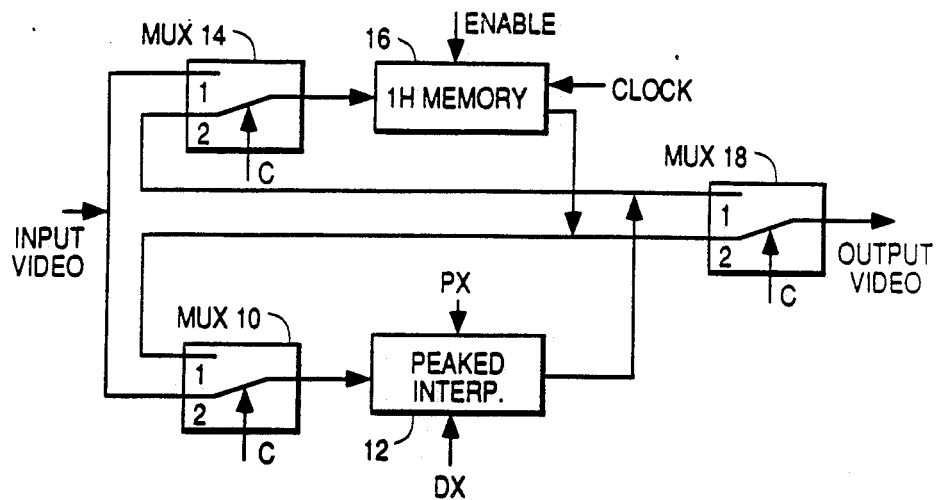
FIG. 1 COMPRESSION MODE
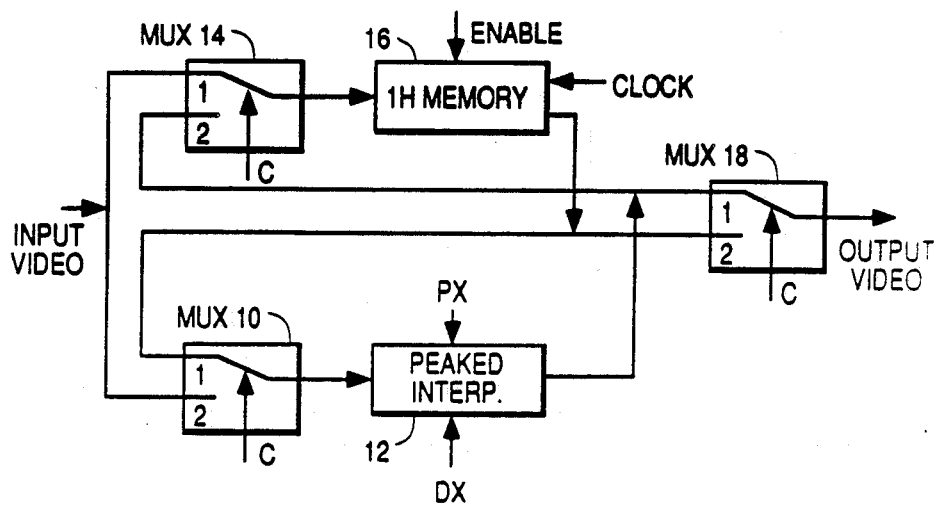
FIG. 2 EXPANSION MODE

APPARATUS FOR COMPUTING INTERPOLATION WEIGHTING FACTOR FOR TIME COMPRESSION OR EXPANSION

This invention concerns apparatus for generating an auxiliary signal to assist in the interpolation of output video signal samples in a video signal time expansion/compression system.

One type of video signal time compression and expansion apparatus used for video signal raster mapping is shown in U.S. Pat. No. 4,855,811—M. A. Isnardi. The apparatus shown in the Isnardi patent includes a pixel counter operating at a 4×fsc rate where fsc is the chrominance subcarrier frequency (3.58 MHz for an NTSC television system). The pixel counter provides an output write address signal M representative of pixel locations on a video raster. The write address signal is applied to a PROM which includes a look-up table containing programmed values depending upon the nature of the raster mapping to be performed, e.g., compression or expansion. In response to the write address signal, the PROM provides an output read address signal N representing an integer number, and an output signal DX representing a fractional number equal to or greater than zero but less than unity.

The PROM permits expansion or compression of a video signal as a function of stored values of signal N. Thus, a programmed value of read address signal N and a programmed value of fractional part DX are provided in response to integer values of the pixel location signal. Signal expansion is provided by producing read address signal N at a slower rate than pixel location signal M. Conversely, to achieve signal compression read address signal N is produced at a rate greater than that of the pixel location signal. Read address signal N and write address pixel location signal M are applied to plural memory units together with the video signal to be time expanded or compressed. Before being applied to a linear interpolator for providing a compressed or expanded output video signal, outputs from the memory units are processed by peaking filters, which provide an amount of peaking depending on the value of signal DX, to compensate for high frequency attenuation by the interpolator. The interpolator also responds to signal DX, which corresponds to the fractional time interval of the interpolated sample.

In the context of a video signal raster mapper, apparatus in accordance with the present invention is disclosed to facilitate time compression or expansion by developing an auxiliary signal (DX) representing a fractional position of output pixel samples between input pixel samples. A multiplexer selectively applies values from two registers to an accumulator for controlling the accumulator value in a manner appropriate for compression or expansion. The first register stores a given time compression value in a compression operating mode, and stores a given time expansion value in an expansion operating mode. The second register stores a negative integer value in the time compression operating mode. The auxiliary signal is provided at an output of the accumulator.

The disclosed apparatus advantageously reduces the complexity of a time compresssion or expansion system, notably with respect to the compression or expansion algorithms and memory requirements. Specifically, memory devices such look-up tables programmed for performing compression, or look-up tables programmed for performing expansion, are not needed.

FIGS. 1 and 2 show apparatus for performing time compression and time expansion, respectively.

Figure 3:
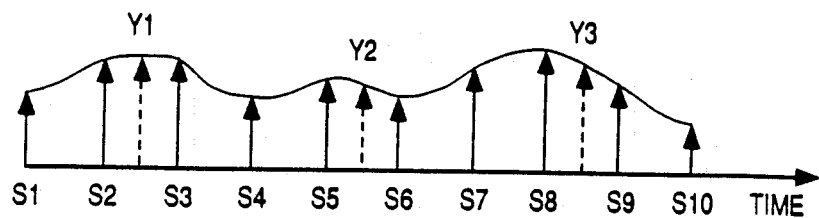
FIGS. 3 and 4 are diagrams of signal samples helpful in understanding the operation of the compression and expansion modes, respectively.
Figure 4:
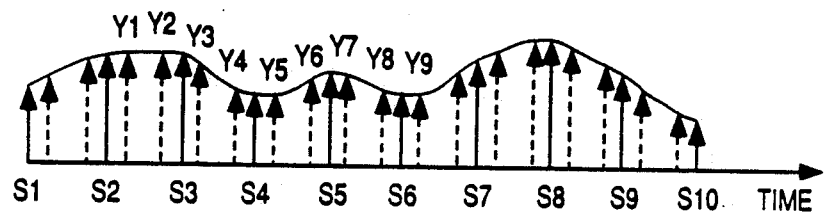

Reference is made to FIGS. 3 and 4 before discussing the apparatus shown in FIGS. 1 and 2. FIG. 3 shows a 3:1 time compression operation in terms of input samples S and desired output Y. In order to calculate interpolated compressed sample Y1, four adjacent input samples S1, S2, S3 and S4 are needed. Adjacent input samples S4, S5, S6 and S7 are needed to calculate the next interpolated sample, Y2. FIG. 4 shows a 1:2 expansion operation in terms of input samples S and desired output samples Y. In order to calculate interpolated expanded samples Y1 and Y2, four adjacent input samples S1, S2, S3 and S4 are needed. Adjacent input samples S2, S3, S4 and S5 are needed for the next two interpolated expanded output samples Y3 and Y4.

FIG. 1 illustrates the configuration of the disclosed apparatus in the time compression mode, wherein input samples are conveyed through a peaked interpolator before being written into memory. Specifically, an input video signal is conveyed via a multiplexer (MUX) 10 to a peaked interpolator 12, e.g., a linear interpolator as disclosed in the aforementioned Isnardi patent and as shown in FIG. 6, and afterwards via a multiplexer 14 to a 1H line memory 16. Memory 16 is a FIFO (first in, first out) memory device responsive to a CLOCK signal and to a read/write clock ENABLE signal which enables data to be written into memory 16 or read out from memory 16 with each clock pulse. The ENABLE signal is provided as will be discussed with respect to FIG. 5. An output signal is derived from memory 16 via a multiplexer 18 in the position shown. Each multiplexer unit has first and second inputs and an output, and responds to a control signal C for determining the MUX position depending upon whether time compression or expansion is desired. Signal C exhibits a fixed value determined by hardware wiring or softward programming so that the disclosed apparatus performs either time compression or time expansion.

Figure 7:
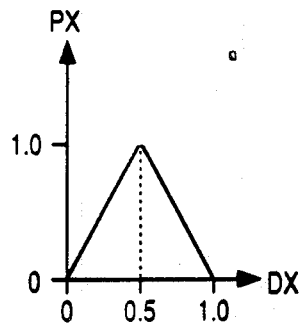
FIGS. 7–9 are diagrams helpful in understanding the operation of aspects of the disclosed apparatus.

FIG. 2 illustrates the configuration of the apparatus of FIG. 1 in the time expansion mode, wherein input samples are first stored in memory, then read out via a peaked interpolar. Specifically, multiplexers 10, 14 and 18 exhibit positions as shown for conveying the input signal via a path including MUX 14, memory 16, MUX 10, peaked interpolar 12, and output MUX 18. The ENABLE and DX signals are provided as will be discused in connection with FIG. 5. A signal PX provides an amount of signal peaking to compensate for high frequency attenuation due to interpolator action. The value of peaking signal PX is a function of the value of signal DX (as indicated by FIG. 7) and can be provided by means of a programmed look-up table. Signal DX represents the fractional position of output signal samples between input pixel samples, as will be seen from the subsequent discussion of FIGS. 8 and 9.

FIG. 6 depicts aspects of peaked interpolator 12. Inputs SO, S1, S2 and S3 represent sequential neighboring pixels of a video signal line, derived from pixel delay units 61a, 61b and 61c as shown. The four pixel neighborhood is used to peak the values of S1 and S2. The value of signal DX represents the distance between pixels S1 and S2. Peaking signal PX is employed to compensate for attenuation of high frequencies due to linear interpolation action as mentioned. In the peaking section, pixels SO-S3 are weighted by networks 60 and 62 as shown. A multiplier 63 provides the product of output signals from network 60 and peaking signal PX, and a multiplier 64 provides the product of output signals from network 62 and peaking signal PX. The output of multiplier 63 is combined with signal S1 in adder 65, and the output of multiplier 64 is combined with signal S2 in adder 66. In the interpolator section, subtractive combiner 67 subtracts the output signal of adder 65 from the output of adder 66, and the resulting difference signal is multiplied with signal DX in a multiplier 68. An adder 69 combines the output signals from multiplier 68 and adder 65 to produce an interpolated output signal. The amount of peaking a particular pixel receives is determined by the value of PX. PX is a function of DX and is a maximum when the interpolated pixel falls exactly halfway between the two peaked values. FIG. 7 depicts the relationship between signals PX and DX.

Figure 5:
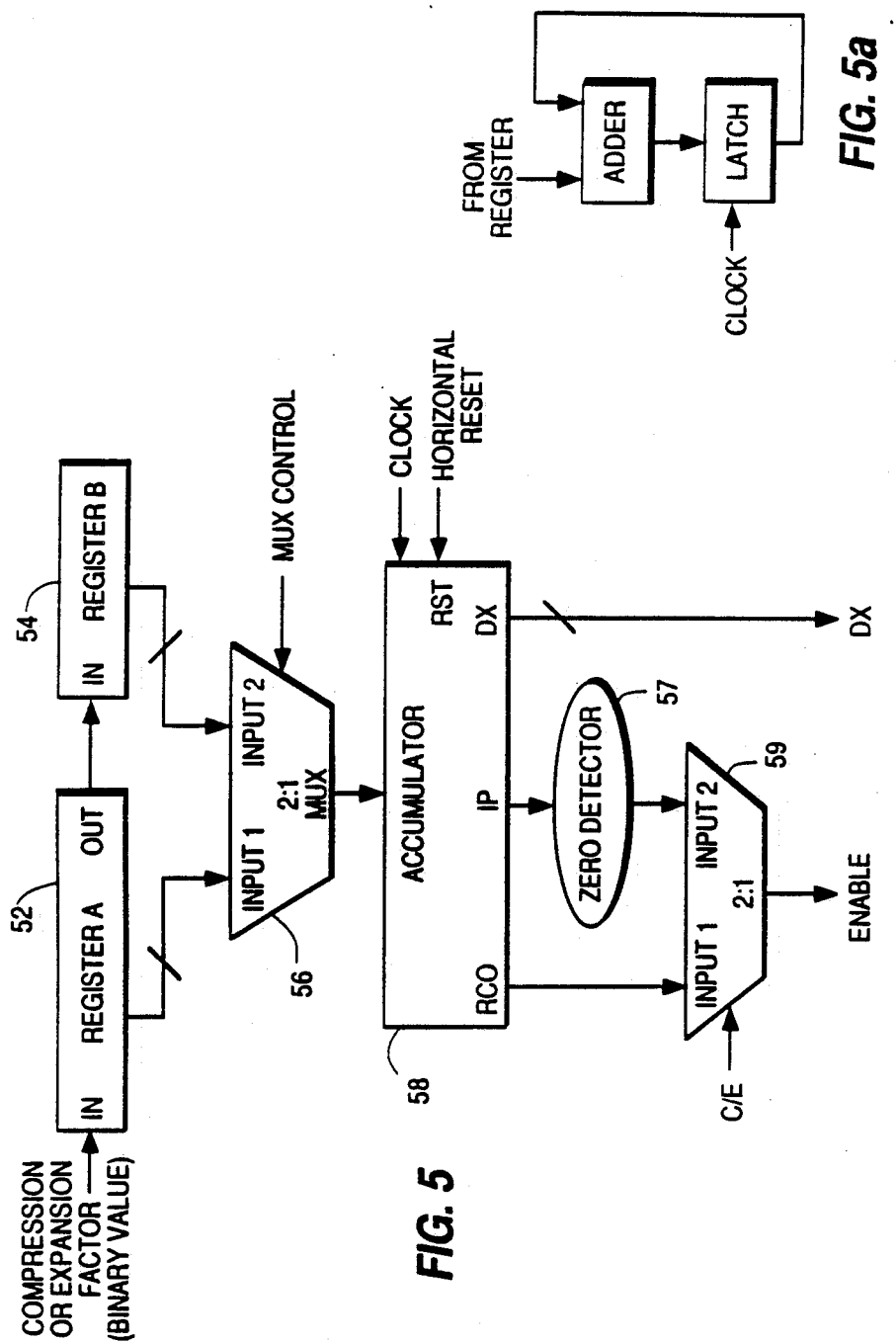
FIG. 5 is a block diagram of a network according to the present invention for developing a signal to assist the operation of the apparatus of FIGS. 1 and 2.
Figure 6:
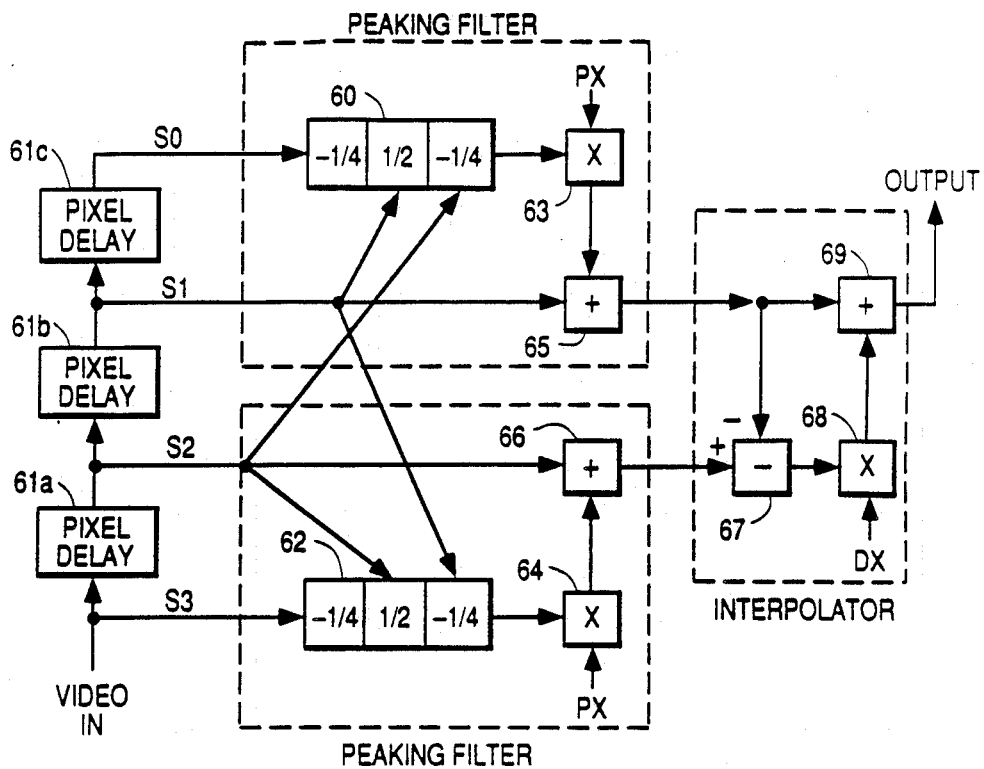
FIG. 6 shows details of the peaked interpolator of FIGS. 1 and 2.
Figure 8:
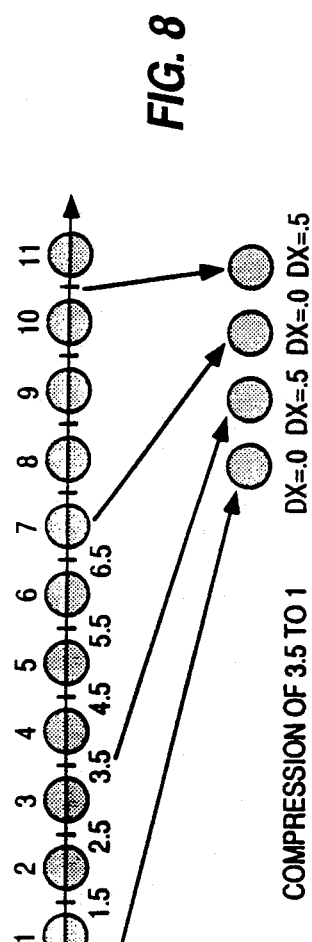
Figure 9:
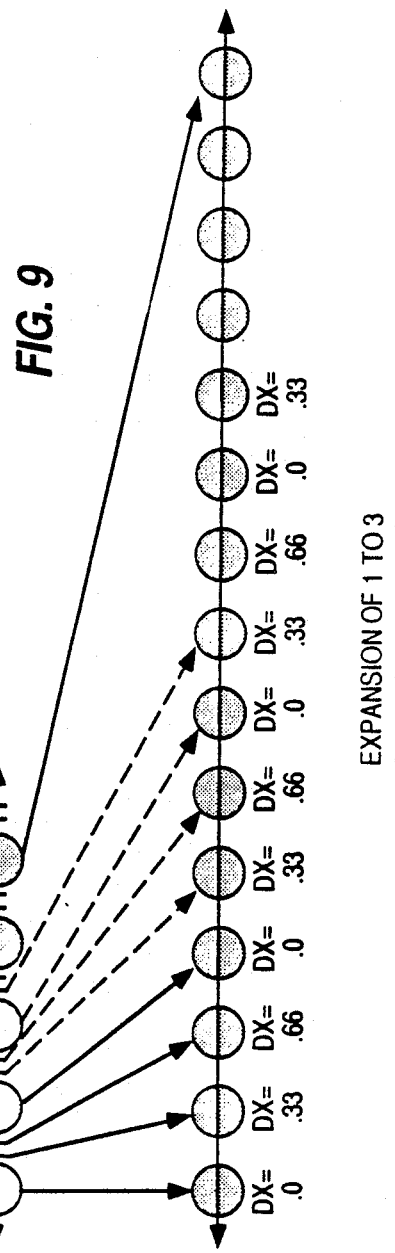

FIG. 5 shows a network for generating the correct value of signal DX necessary for proper video signal interpolation in both time compression and time expansion modes. The network of FIG. 5 permits the use of only one memory device for expansion or compression. During compression, signal DX is derived relative to the input pixel stream as shown in FIG. 8 for 3.5 to 1 compression. During expansion, signal DX is developed as shown in FIG. 9 for 1 to 3 expansion. It is necessary for the network to know where it is operating along the input pixel stream to select the appropriate DX for calculation of a compressed pixel. However, the circuit must know where it is along the output pixel stream to select the appropriate DX for correct calculation of an expanded pixel.

FIG. 5 contains first and second selectable state input registers 52 and 54 with outputs selectively coupled to an accumulator 58 via a multiplexer (MUX) 56. As arranged in FIG. 5, each register stores the binary value of either a compression factor or an expansion factor in response to a signal representing either of such factors being applied to an input of register 52. However, registers 52 and 54 need not be interconnected as shown, in which case each would receive its own independent version of the compression or expansion factor signal. Accumulator 58 includes an arrangement of an adder and a latch of conventional design, as indicated by FIG. 5a.

For compression the binary accumulator state is interpreted as a positive real number with an integer part and a fractional part. Compression is performed by loading a desired compression factor in register 52, and loading a −1 value into register 54. Initially, the output of register 52 is applied to the input of accumulator 58 via input 1 of multiplexer (MUX) 56 in response to an initial condition of the MUX CONTROL signal. After the value in register 52 is clocked into accumulator 58, the value of the MUX CONTROL signal changes so that MUX 56 selects register 54. That is, the output of register 54 is conveyed via input 2 of multiplexer 56 to the input of accumulator 58. With each clock pulse the −1 value in register 54 is coupled to accumulator 58. The effect of adding the −1 value from register 54 is to substract a "1" value from the integer part of the accumulator value. After the addition of each −1 value to accumulator 58, the integer part (IP) of the accumulator value is examined at the IP output of accumulator 58 by means of a zero detector 57 to determined if the integer part is zero. When the integer part of the accumulator value reaches zero, the appropriate value of DX for the compression process has been calculated. At this time the MUX CONTROL signal line is toggled in response to the IP output of accumulator 58 exhibiting a zero value, i.e., the output of zero detector 57 is sensed to toggle the MUX CONTROL signal line, whereby the value in register 52 is again added into accumulator 58 via MUX 56 and the process repeats.

A more specific example of the compression process with respect to FIG. 8 follows. First, the value of the C/E (compression/expansion) select input to MUX 59 is established for compression operation. In such case MUX 59 is caused to select the signal applied to its INPUT 2, the output from zero detector 57, as the read/write ENABLE signal for the memory unit of FIGS. 1 and 2. Registers 52 and 54 are then loaded with the two's complement binary equivalent of compression factor 3.5 and −1, respectively. The MUX CONTROL signal then causes MUX 56 to select its INPUT 1 signal, whereby the value of register 52 (the 3.5 compression value) is applied to the input of accumulator 58. Next, the MUX CONTROL signal causes MUX 56 to select its INPUT 2 signal, whereby the −1 value of register 54 is applied to accumulator 58. The accumulator value is 2.5 after the −1 value from register 54 is added. As the process continues, the accumulator value becomes 1.5, then 0.5, at which time zero detector 57 triggers and provides an output signal indicating that the integer part (IP) is now zero. The ENABLE signal output then toggles (changes state) to indicate that the appropriate pixel and DX have been computed.

For time expansion the binary accumulator value is interpreted as a positive fraction, e.g., for a 1 to 3 expansion the fractional accumulator value would be ⅓ or 0.33. Expansion is performed by loading the binary equivalent of the expansion factor into register 52. The value of the C/E select input to MUX 59 is established for expansion operation. In such case MUX 59 is caused to select as the ENABLE signal the signal applied to its INPUT 1, the Ripple Carry Output (RCO) overflow signal from accumulator 58. The MUX CONTROL signal value is such as to cause MUX 56 to select its INPUT 1, the value from register 52, as the input to accumulator 58. With each clock pulse the accumulator repeatedly adds the value from register 52, thereby varying DX. When an accumulator overflow occurs (i.e., when the RCO output line toggles), the correct DX value has been computed. The accumulator is allowed to wrap around and the process continues. For example, if a 1 to 3 expansion is being performed the accumulator values would be 0.0, 0.333, 0.667, RCO, 0.333, 0.667, RCO, etc. Every occurrence of RCO represents an overflow of the accumulator and indicates the need to update the pixel stream to continue the interpolation process.

A HORIZONTAL RESET signal is applied to a RST (reset) input of accumulator 58 for resetting the accumulator value for each horizontal scanning line. The HORIZONTAL RESET signal an be developed by sensing each horizontal synchronizing pulse, for example.

The disclosed apparatus supports a variety of expansion and compression factors with good memory management allowing efficient use of memory. This is accomplished by means of a programmable architecture, as illustrated by FIGS. 1 and 2, in which the user can direct the video data over the sequence of peaked interpolation then storage in memory, or vice-versa, depending upon whether compression or expansion is selected. Only one 1H line storage memory device is required, such as element 16 in FIGS. 1 and 2. This represents a significant savings in memory compared to the apparatus shown in the aforementioned Isnardi patent, which requires four dual port memory devices to perform the raster mapping function. A significant savings in memory also results from the apparatus shown in FIG. 5 for generating signal DX without needing programmed look-up tables for either the compression or expansion operating modes.

What is claimed is:

1. Apparatus for facilitating video signal time compression or time expansion, comprising:
   a first storage device for storing a first value representing a desired time compression factor in a compression operating mode, and storing a second value representing a desired time expansion factor in an expansion operating mode;
   a second storage device for storing a negative integer value in said time compression mode;
   an accumulator;
   means for selectively applying stored values from said first and second storage devices to said accumulator; and
   means for deriving from said accumulator an auxiliary signal representing a fractional position of output pixel samples between input pixel samples.

2. Apparatus according to claim 1, wherein
   said negative integer value is −1; and
   said stored value representing a desired time expansion factor is a non-integer value.

3. Apparatus according to claim 1, wherein
   said stored first value of said first device is initially applied to said accumulator in a compression operating mode; and
   said stored negative integer value of said second device is afterwards successively applied to said accumulator in said compression operating mode until an output of said accumulator exhibits a zero integer value, at which time said auxiliary signal is produced by said accumulator.

4. Apparatus according to claim 1, wherein
   said stored first value of said first device is continuously applied to said accumulator in a time expansion operating mode.

5. Apparatus according to claim 1, wherein
   said accumulator has a signal input, an integer output providing an indication of the integer status of the accumulator value, and a signal output for providing said auxiliary signal; and said apparatus further includes
   control means for (a) initially applying said stored first value representing said compression factor to said signal input of said accumulator in said compression operating mode, and (b) afterwards successively applying said stored negative integer value to said signal input of said accumulator in said compression operating mode, until said integer output of said accumulator means is indicative of a zero integer value, at which time said auxiliary signal is produced at said signal output of said accumulator means.

6. Apparatus according to claim 1, wherein
   said accumulator has a signal input, an overflow output providing an indication of an accumulator overflow condition, and a signal output for providing said auxiliary signal; and said apparatus further includes
   control means for applying said expansion factor value from said first device exclusive of any value stored in said second device to said accumulator signal input in said expansion operating mode, until said overflow indicates an overflow condition, at which time said auxiliary signal is produced.

* * * * *